United States Patent
Takeuchi

(10) Patent No.: US 12,343,905 B2
(45) Date of Patent: Jul. 1, 2025

(54) METHOD FOR PRODUCING CYCLOOLEFIN RESIN-DECORATIVE MOLDED ARTICLE

(71) Applicant: RIMTEC Corporation, Tokyo (JP)

(72) Inventor: Masaki Takeuchi, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 178 days.

(21) Appl. No.: 17/604,543

(22) PCT Filed: Apr. 20, 2020

(86) PCT No.: PCT/JP2020/017059
§ 371 (c)(1),
(2) Date: Oct. 18, 2021

(87) PCT Pub. No.: WO2020/218242
PCT Pub. Date: Oct. 29, 2020

(65) Prior Publication Data
US 2022/0212381 A1   Jul. 7, 2022

(30) Foreign Application Priority Data
Apr. 23, 2019  (JP) ................. 2019-081554

(51) Int. Cl.
| B29C 37/00 | (2006.01) |
| B29C 39/12 | (2006.01) |
| B29C 45/16 | (2006.01) |
| B29C 67/24 | (2006.01) |
| B29C 70/00 | (2006.01) |
| B29C 70/08 | (2006.01) |
| B29C 70/48 | (2006.01) |
| B29K 23/00 | (2006.01) |
| B29K 309/00 | (2006.01) |

(52) U.S. Cl.
CPC .......... *B29C 37/0032* (2013.01); *B29C 39/12* (2013.01); *B29C 45/16* (2013.01); *B29C 67/246* (2013.01); *B29C 70/003* (2021.05); *B29C 70/086* (2013.01); *B29C 70/48* (2013.01); *B29C 2037/0035* (2013.01); *B29K 2023/38* (2013.01); *B29K 2309/00* (2013.01)

(58) Field of Classification Search
None
See application file for complete search history.

(56) References Cited

U.S. PATENT DOCUMENTS

| 4,205,028 | A | 5/1980 | Brueggemann et al. |
| 7,431,789 | B2 * | 10/2008 | Mack ............... C09D 133/04 525/39 |
| 7,687,635 | B2 * | 3/2010 | Verpoort ............ C07F 15/02 556/137 |
| 9,803,046 | B2 * | 10/2017 | Stephen ............ C08G 61/08 |
| 10,351,682 | B2 * | 7/2019 | Takeuchi ............ C08J 5/043 |
| 2005/0048214 | A1 | 3/2005 | Mack et al. |
| 2014/0370318 | A1 | 12/2014 | Stephen et al. |
| 2016/0017089 | A1 | 1/2016 | Stephen et al. |
| 2017/0037202 | A1 | 2/2017 | Takeuchi |

FOREIGN PATENT DOCUMENTS

| CN | 105189573 A | 12/2015 |
| JP | 2002-331547 A | 11/2002 |
| JP | 2003-94454 A | 4/2003 |
| JP | 2005-271535 A | 10/2005 |
| JP | 4758911 B2 | 8/2011 |
| JP | 2016-8243 A | 1/2016 |
| WO | 03/062253 A1 | 7/2003 |
| WO | 2005/046958 A1 | 5/2005 |
| WO | 2008/120721 A1 | 10/2008 |
| WO | 2015/098636 A1 | 7/2015 |

OTHER PUBLICATIONS

International Search Report dated Jun. 30, 2020, issued in counterpart International Application No. PCT/JP2020/017059 (2 pages).
Extended (Supplementary) European Search Report dated Dec. 16, 2022, issued in counterpart EP Application No. 20795972.7. (7 pages).
International Preliminary Report on Patentability (Form PCT/IB/373) issued in counterpart International Application No. PCT/JP2020/017059 dated Sep. 28, 2021, with Form PCT/ISA/237. (5 pages).

\* cited by examiner

*Primary Examiner* — Benjamin A Schiffman
(74) *Attorney, Agent, or Firm* — WHDA, LLP

(57) ABSTRACT

Provided is a method for producing a decorated cycloolefin resin molded article, the method comprising curing a gel coat composition and polymerizing a cycloolefin polymerizable composition containing a radical generator while the gel coat composition is in contact with the cycloolefin polymerizable composition, thereby containing a decorated cycloolefin resin molded article including a gel coat and a cycloolefin resin layer adhering to each other.

3 Claims, No Drawings

METHOD FOR PRODUCING CYCLOOLEFIN RESIN-DECORATIVE MOLDED ARTICLE

TECHNICAL FIELD

The present invention relates to a method for producing a decorated cycloolefin resin molded article.

BACKGROUND ART

Conventionally, coatings of cycloolefin resin molded articles are usually formed using application.

Patent Document 1 discloses a method of injecting a radically polymerizable coating material into a metal mold containing a cycloolefin resin molded article cured inside the metal mold to form a coating film on the surface thereof.

Patent Document 2 discloses a cycloolefin polymerizable composition comprising a radically polymerizable monomer and a coexisting radical generator, but not formation of a coating film on the surface of the cycloolefin resin molded article.

RELATED ART

Patent Documents

Patent Document 1: WO-A1-2005/046958
Patent Document 2: WO-A1-2015/098636
Patent Document 3: JP 2005-271535 A
Patent Document 4: JP 2016-8243 A

SUMMARY OF THE INVENTION

Problem to be Solved by the Invention

An object of the present invention is to provide a method for producing a decorated cycloolefin resin molded article including a gel coat and a cycloolefin resin layer adhering to each other.

MEANS FOR SOLVING THE PROBLEM

The present invention provides a method for producing a decorated cycloolefin resin molded article, comprising curing a gel coat composition and polymerizing a cycloolefin polymerizable composition containing a radical generator while the gel coat composition is in contact with the cycloolefin polymerizable composition, thereby obtaining a decorated cycloolefin resin molded article including a gel coat and a cycloolefin resin layer adhering to each other.

In the production method according to the present invention, the gel coat composition preferably contains 1.5 mass % or less of a curing accelerator.

In the production method according to the present invention, the cycloolefin polymerizable composition preferably contains a filler.

In the production method according to the present invention, the filler preferably includes at least one of a fibrous filler and a particulate filler.

Effects of Invention

The present invention can provide a method for producing a decorated cycloolefin resin molded article including a gel coat and a cycloolefin resin layer adhering to each other.

DESCRIPTION OF EMBODIMENTS

The production method according to the present invention comprises curing a gel coat composition and polymerizing a cycloolefin polymerizable composition containing a radical generator while the gel coat composition is in contact with the cycloolefin polymerizable composition. The production method according to the present invention can provide a decorated cycloolefin resin molded article including a gel coat formed of the gel coat composition and a cycloolefin resin layer formed of the cycloolefin polymerizable composition, the gel coat adhering to the cycloolefin resin layer.

In this specification, "adhering" of the gel coat and the cycloolefin resin layer indicates that the gel coat and the cycloolefin resin layer adhere to each other to a degree classified to classification 0 or 1 of the 6-ranked classification in evaluation of adhesive properties according to JIS K5600.

The decorated cycloolefin resin molded article prepared by the production method according to the present invention includes a gel coat, thereby ensuring deep high-quality decoration of the cycloolefin resin molded article.

The gel coat is formed with a gel coat composition in the present invention. The gel coat composition is a liquid thermosetting resin composition or a light curable resin composition comprising one of an unsaturated polyester resin, a vinyl ester resin, an acrylic resin, and the like or a mixture thereof as a base resin, and any additives such as a curing agent component (polymerization initiator) and a pigment. For example, using a spray or a brush, the gel coat composition is applied onto the surface of the mold to be used, and then a cycloolefin resin layer is formed thereon; or reversely, the gel coat composition is applied onto a cycloolefin resin layer.

The gel coat composition may be uncured or semi-cured, but not cured. The gel coat can be formed by curing the gel coat composition on the cycloolefin resin layer. Fran the viewpoint of workability, it is preferred that the gel coat be formed by curing an uncured gel coat composition. The semi-cured gel coat composition is a partially cured product of the uncured gel coat composition, and can be cured to any degree as long as demonstration of desired effects of the present invention are not inhibited.

Preferably, the gel coat composition does not substantially contain a curing accelerator as described later. Here, the expression "not substantially contain a curing accelerator" indicates that the content of the curing accelerator in the gel coat composition is 1.5 mass % or less. The content of the curing accelerator is preferably 1.2 mass % or less, more preferably 1 mass % or less. The gel coat formed of such as gel coat composition does not substantially contain the curing accelerator or residues derived from the curing accelerator. Examples of the curing accelerator include metallic soaps such as manganese compounds and cobalt compounds, quaternary ammonium salts, and amines.

It is usually expected that adhesion of the gel coat to the cycloolefin resin layer has significant difficulties due to their properties with respect to the polymerization reaction. The reason is that while the cycloolefin resin layer is prepared by a metathesis polymerization reaction in the presence of a metathesis polymerization catalyst as described in Patent Document 3, the gel coat is prepared by a radical polymerization reaction in the presence of a polymerization initiator (curing agent component), a curing accelerator, and the like as described in Patent Document 4. A standard gel coat usually contains more than 1.5 mass % of a curing accelerator.

However, as a result of extensive research, it has been found that the gel coat and the cycloolefin resin layer adhere to each other by progressing curing of the gel coat composition and polymerization of the cycloolefin polymerizable composition while the gel coat composition is in contact with the cycloolefin polymerizable composition.

Furthermore, it has been found that use of a gel coat composition substantially not containing the curing accelerator results in tighter adhesion between the gel coat and the cycloolefin resin layer. For example, an uncured or semi-cured gel coat composition containing a curing agent component but not a curing accelerator is applied onto a mold, and then a cycloolefin polymerizable composition containing a radical generator is placed on the coating film of the gel coat composition. Thereafter, the gel coat composition is cured and the cycloolefin polymerizable composition is polymerized while the uncured or semi-cured gel coat composition is in contact with the cycloolefin polymerizable composition containing a radical generator. Thereby, both of the cycloolefin polymerizable composition and the gel coat composition are cured to adhere to each other.

The following reason is inferred why favorable adhesion is provided in the case where the gel coat composition does not substantially contain a curing accelerator. If the gel coat composition contains a curing accelerator which contributes to a curing reaction, the curing reaction rate of the gel coat composition is significantly higher than the polymerization reaction rate of the cycloolefin polymerizable composition, and radical species derived from the radical initiator in the cycloolefin polymerizable composition are not efficiently reacted with radical species in the gel coat composition, thus obstructing sufficient formation of cross-linked structures, such as covalent bonds, between the base resin forming the gel coat and the cycloolefin resin forming the cycloolefin resin layer. In contrast, if a gel coat composition containing a curing agent component but not substantially containing a curing accelerator and a cycloolefin polymerizable composition containing a radical generator are used, structures to increase adhesion are sufficiently formed between the base resin forming the gel coat and the cycloolefin resin forming the cycloolefin resin layer, resulting in adhesion therebetween.

The base resin to be used in the gel coat composition can be one of an unsaturated polyester resin, a vinyl ester resin, an acrylic resin, and the like or a combination thereof.

The unsaturated polyester resin is given by a condensation reaction of an unsaturated dibasic acid such as maleic acid or fumaric acid with a polyhydric alcohol such as ethylene glycol, propylene glycol, or trimethylolpropane.

The vinyl ester resin is an epoxy resin having an acrylic or methacrylic group added thereto, and is given by dissolution in a vinyl monomer similarly to the case of the unsaturated polyester resin.

The acrylic resin is composed of a homopolymer or copolymer of an acrylate ester or a methacrylate ester.

Examples of the curing agent component (polymerization initiator) include thermal curing agents and light curing agents. Among these, preferred are thermal curing agents because these facilitate progression of the curing reaction with the polymerization reaction of the cycloolefin polymerizable composition.

Examples of the thermal curing agents include organic peroxides, and specially include known thermal curing agents of diacyl peroxides, peroxy esters, hydroperoxides, dialkyl peroxides, ketone peroxides, peroxy ketals, alkyl peresters, and percarbonates, and the like. Although the thermal curing agent can be added in any amount in the range ensuring the objective of the present invention, the amount is usually 0.2 to 5 parts by mass, preferably 0.5 to 4 parts by mass, more preferably 0.7 to 3 parts by mass relative to 100 parts by mass of the base resin. The adhesion between the gel coat and the cycloolefin resin layer can be increased by appropriately adjusting the curing temperature depending on the ambient temperature or the like.

Examples of the light curing agents include those of benzoin ethers such as benzoin alkyl ethers, benzophenone compounds such as benzophenone, benzyl, and methyl-orthobenzoyl benzoate, acetophenone compounds such as benzyl dimethyl ketal, 2,2-diethoxyacetophenone, 2-hydroxy-2-methylpropiophenone, 4-isipropyl-2-hydroxy-2-methylpropiophenone, and 1,1-dichloroacetophenone, thioxanthone compounds such as 2-chlorothioxanthone, 2-methylthioxanthone, and 2-isopropylthioxanthone, and the like. The amount of the light curing agent to be added is usually 0.1 to 3 parts by mass relative to 100 parts by mass of the base resin.

To adjust the curing rate, the gel coat composition may further contain a polymerization inhibitor or the like. Examples of the polymerization inhibitor include trihydrobenzene, toluhydroquinone, 1,4-naphthoquinone, para-benzoquinone, hydroquinone, benzoquinone, hydroquinone monomethyl ether, p-tert-butylcatechol, 2,6-di-tert-butyl-4-methylphenol, and the like. The amount of the polymerization inhibitor to be added is usually 10 to 1000 ppm, preferably 50 to 200 ppm in the gel coat composition. Use thereof within this range results in a gel coat composition having increased storage stability, workability, and strength demonstration.

The gel coat composition used in the present invention may optionally contain a pigment, an extender pigment, a dye, a colorant, a thixotropic agent, an ultraviolet absorber, a photostabilizer, an antifoaming agent, a leveling agent, an internal mold release agent, a wax, an antioxidant, a filler, a dispersant, and a flame retardant, which are traditionally known.

The decorated cycloolefin resin molded article prepared by the production method according to the present invention includes a cycloolefin resin layer. The cycloolefin resin in this specification indicates a polymer (homopolymer) prepared through polymerization of a monomer having a cycloolefin structure or a copolymer prepared through polymerization of several monomers each having a cycloolefin structure. The presence/absence of the cycloolefin structure in the polymer can be analyzed using nuclear magnetic resonance (NMR), for example.

The cycloolefin resin layer is obtained through polymerization (suitably bulk polymerization) of the cycloolefin polymerizable composition. The cycloolefin polymerizable composition is prepared by appropriately mixing a cycloolefin monomer, a metathesis polymerization catalyst, a radical generator, and any optionally blended components such as a catalyst activator and a filler by a known method.

First, the components contained in the cycloolefin polymerizable composition will be described.

Cycloolefin Monomer

A cycloolefin monomer is a compound having an alicyclic structure and a carbon-carbon double bond in the molecule.

Examples of the alicyclic structure constituting the cycloolefin monomer include a monocyclic ring, a polycyclic ring, a condensed polycyclic ring, a bridged ring, and a combination polycyclic ring thereof. There is no particular limitation to the number of carbons constituting the alicyclic structure, but the number thereof is usually 4 to 30, preferably 5 to 20, and more preferably 5 to 15.

Examples of the cycloolefin monomer include a monocyclic cycloolefin monomer and a norbornene-based monomer, and a norbornene-based monomer is preferred. The norbornene-based monomer is a cycloolefin monomer having a norbornene ring structure in its molecular. These may be substituted by a hydrocarbon group such as an alkyl group, an alkenyl group, an alkylidene group, and an aryl group, or a polar group or the like. In addition, the norbornene-based monomer may have a double bond other than the double bond of the norbornene ring.

Examples of the monocyclic cycloolefin monomer include cyclobutene, cyclopentene, cyclooctene, cyclododecene, cyclopentadiene, and 1,5-cyclooctadiene.

Specific examples of norbornene-based monomers include dicyclopentadiene compounds such as dicyclopentadiene and methylcyclopentadiene;

tetracyclododecene compounds such as tetracyclo[6.2.1.1$^{3,6}$.0$^{2,7}$]dodeca-4-ene, 9-ethylidene tetracyclo[6.2.1.1$^{3,6}$.0$^{2,7}$]dodeca-4-ene, 9-phenyl tetracyclo[6.2.1.1$^{3,6}$.0$^{2,7}$]dodeca-4-ene, tetracyclo[6.2.1.1$^{3,6}$.0$^{2,7}$]dodeca-9-ene-4-carboxylic acid, and tetracyclo[6.2.1.1$^{3,6}$.0$^{2,7}$]dodeca-9-ene-4,5-dicarboxylic anhydride;

norbornene compounds such as 2-norbornene, 5-ethylidene-2-norbornene, 5-vinyl-2-norbornene, 5-phenyl-2-norbornene, 5-norbornen-2-yl acrylate, 5-norbornen-2-yl methacrylate, 5-norbornene-2-carboxylic acid, 5-norbornene-2,3-dicarboxylic acid, and 5-norbornene-2,3-dicarboxylic anhydride;

oxanorbornenes such as 7-oxa-2-norbornene and 5-ethylidene-7-oxa-2-norbornene; and tetra- or more cyclic olefins such as tetracyclo[9.2.1.0$^{2,10}$.0$^{3,8}$]tetradeca-3,5,7,12-tetraene (also referred to as 1,4-methano-1,4,4a,9a-tetrahydro-9H-fluorene), pentacyclo[6.5.1.1$^{3,6}$.0$^{2,7}$.0$^{9,13}$]pentadeca-4,10-diene, pentacyclo[9.2.1.0$^{2,10}$.0$^{3,8}$]pentadeca-5,12-diene, and tricyclopentadiene.

Among these cycloolefin monomers, a cycloolefin monomer having no polar group is preferred because a molded article having low water absorption can be obtained. When a cycloolefin monomer having an aromatic condensed ring such as tetracyclo[9.2.1.0$^{2,10}$.0$^{3,8}$]tetradeca-3,5,7,12-tetraene or the like is used, the viscosity of the cycloolefin polymerizable composition can be lowered.

These cycloolefin monomers may be used alone or in combination. By a combination use, the physical properties of the obtained cycloolefin resin can be appropriately adjusted.

Note that, in the cycloolefin polymerizable composition used in the present invention, any monomer copolymerizable with the above-described cycloolefin monomer may be contained as long as the expression of the effect of the present invention is not inhibited.

Metathesis Polymerization Catalyst

The metathesis polymerization catalyst used in the present invention is not particularly limited as long as it is capable of ring-opening polymerizing a cycloolefin monomer, and a known one can be used.

The metathesis polymerization catalyst used in the present invention is a complex containing a transition metal atom as a central atom to which a plurality of ions, atoms, polyatomic ions and/or compounds are bonded. As the transition metal atom, atoms of Groups 5, 6 and 8 (Long Periodic Table, hereinafter the same) are used. Although there is no particular limitation to the atoms of the respective groups, examples of the atoms of Group 5 include tantalum, and those of the atoms of Group 6 include molybdenum and tungsten, and those of the atoms of Group 8 include ruthenium and osmium.

As a metathesis polymerization catalyst containing tungsten or molybdenum of Group 6 as the central metal, the followings can be used: metal halides such as tungsten hexachloride; metal oxyhalides such as tungsten chloride oxide; metal oxides such as tungsten oxide; ammonium salts of organic metal acids such as tridecylammonium molybdate and tri (tridecyl) ammonium molybdate; and the like.

A preferred metathesis polymerization catalyst containing ruthenium or osmium of Group 8 as the central metal is a ruthenium carbene complex in which a carbene compound is coordinated with ruthenium. Here, the "carbene compound" is a generic name for a compound having a methylene free radical, and refers to a compound having an uncharged divalent carbon atom (carbene carbon) represented by (>C:).

Examples of the ruthenium carbene complex include those represented by the following general formula (1) or (2).

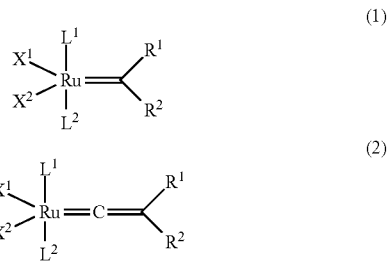

In the general formulas (1) and (2) above, R$^1$ and R$^2$ are independently a hydrogen atom; a halogen atom; or an organic group having 1 to 20 carbon atoms which may contain a halogen atom, an oxygen atom, a nitrogen atom, a sulfur atom, a phosphorus atom, or a silicon atom; these groups may be substituted or not substituted or may be bonded to each other to form a ring. Examples of R$^1$ and R$^2$ bonded to each other to form a ring include an indenylidene group which may have a substituent, such as a phenylindenylidene group.

Specific examples of the organic group having 1 to 20 carbon atoms which may contain a halogen atom, an oxygen atom, a nitrogen atom, a sulfur atom, a phosphorus atom, or a silicon atom include an alkyl group having 1 to 20 carbon atoms, an alkenyl group having 2 to 20 carbon atoms, an alkynyl group having 2 to 20 carbon atoms, an aryl group having 6 to 20 carbon atoms, an alkoxy group having 1 to 20 carbon atoms, an alkenyloxy group having 2 to 20 carbon atoms, an alkynyloxy group having 2 to 20 carbon atoms, an aryloxy group having 6 to 20 carbon atoms, an alkylthio group having 1 to 8 carbon atoms, a carbonyloxy group, an alkoxycarbonyl group having 1 to 20 carbon atoms, an alkylsulfonyl group having 1 to 20 carbon atoms, an alkylsulfinyl group having 1 to 20 carbon atoms, an alkylsulfonic acid group having 1 to 20 carbon atoms, an arylsulfonic acid group having 6 to 20 carbon atoms, a phosphinic acid group, an arylphosphonic acid group having 6 to 20 carbon atoms, an alkylammonium group having 1 to 20 carbon atoms, an arylammonium group having 6 to 20 carbon atoms, and the like. These organic group having 1 to 20 carbon atoms which may contain a halogen atom, an oxygen atom, a nitrogen atom, a sulfur atom, a phosphorus atom, or a silicon atom may be substituted or not substituted. Examples of the substituent include an alkyl group having 1 to 10 carbon atoms, an alkoxy group having 1 to 10 carbon atoms, and an aryl group having 6 to 10 carbon atoms.

X$^1$ and X$^2$ each independently represent any anionic ligand. The anionic ligand is a ligand having a negative charge when separated from a central metal atom, and examples thereof include a halogen atom, a diketonate group, a substituted cyclopentadienyl group, an alkoxyl group, an aryloxy group, a carboxyl group, and the like.

$L^1$ and $L^2$ represent a heteroatom-containing carbene compound or a neutral electron-donating compound other than the heteroatom-containing carbene compound. The heteroatom-containing carbene compound and the neutral electron-donating compound other than the heteroatom-containing carbene compound are compounds having a neutral charge when separated from a central metal atom. Fran the viewpoint of improving the catalytic activity, a heteroatom-containing carbene compound is preferred. The heteroatom means atoms of Groups 15 and 16 of the Periodic Table, and specifically, examples thereof include a nitrogen atom, an oxygen atom, a phosphorus atom, a sulfur atom, an arsenic atom, a selenium atom, and the like. Among these, from the viewpoint of obtaining a stable carbene compound, a nitrogen atom, an oxygen atom, a phosphorus atom, and a sulfur atom are preferred, and a nitrogen atom is more preferred.

As the heteroatom-containing carbene compound, a compound represented by the following general formula (3) or (4) is preferred, and from the viewpoint of improving catalytic activity, a compound represented by the following general formula (3) is further preferred.

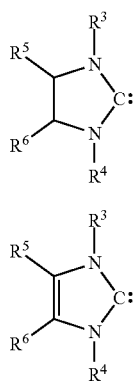

(3)

(4)

In the general formulas (3) and (4) above, $R^3$, $R^4$, $R^5$, and $R^6$ each independently represent a hydrogen atom; a halogen atom; or an organic group having 1 to 20 carbon atoms which may contain a halogen atom, an oxygen atom, a nitrogen atom, a sulfur atom, a phosphorus atom, or a silicon atom. Specific examples of the organic group having 1 to 20 carbon atoms which may contain a halogen atom, an oxygen atom, a nitrogen atom, a sulfur atm, a phosphorus atom, or a silicon atom are the same as those of the general formulas (1) and (2) above.

$R^3$, $R^4$, $R^5$, and $R^6$ may also be bonded to each other in any combination to form a ring.

Since the effect of the present invention becomes more prominent, it is preferable that $R^5$ and $R^6$ be hydrogen atoms. $R^3$ and $R^4$ are preferably an aryl group which may be substituted or not substituted, more preferably a phenyl group having an alkyl group having 1 to 10 carbon atoms as substituents, and more preferably a mesityl group.

Examples of the neutral electron-donating compound include an oxygen atom, water, carbonyls, ethers, nitriles, esters, phosphines, phosphinites, phosphites, sulfoxides, thioethers, amides, imines, aromatics, cyclic diolefins, olefins, isocyanides, and thiocyanates.

In the general formulas (1) and (2), $R^1$, $R^2$, $X^1$, $X^2$, $L^1$, and $L^2$ may stand alone and/or be bonded to each other in any combination to form a multidentate chelating ligand.

Further, among the compounds represented by the above general formula (1) or (2), the ruthenium carbene complex used in the present invention is preferably a compound represented by the above general formula (1) from the viewpoint of the ore remarkable effect of the present invention, and especially, a compound represented by the following general formula (5) or (6) is more preferred.

The general formula (5) is shown below.

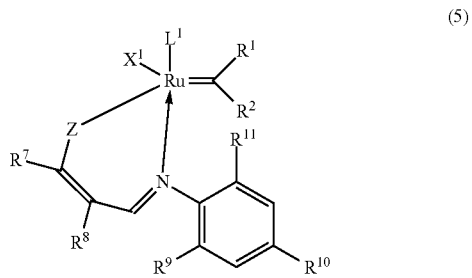

(5)

In the general formula (5), Z is an oxygen atom, a sulfur atom, a selenium atom, $NR^{12}$, $PR^{12}$, or $AsR^{12}$, and $R^{12}$ is a hydrogen atom, a halogen atom, or an organic group having 1 to 20 carbon atoms which may contain a halogen atom, an oxygen atom, a nitrogen atom, a sulfur atom, a phosphorus atom, or a silicon atom; however, as Z, an oxygen atom is preferred because the effect of the present invention becomes more pronounced.

$R^1$, $R^2$, $X^1$, and $L^1$ are the same as in the general formulas (1) and (2), and may stand alone and/or be bonded to each other in any combination to form a multidentate chelating ligand. However, it is preferable that $X^1$ and $L^1$ do not form a multidentate chelating ligand and that $R^1$ and $R^2$ be bonded to each other to form a ring, which is more preferably an indenylidene group which may be substituted or not substituted, even more preferably a phenylindenylidene group.

Further, specific examples of the organic group having 1 to 20 carbon atoms which may contain a halogen atom, an oxygen atom, a nitrogen atom, a sulfur atom, a phosphorus atom, or a silicon atom are the same as these of the general formulas (1) and (2) above.

In the above general formula (5), $R^7$ and $R^8$ each independently represent a hydrogen atom, an alkyl group having 1 to 20 carbon atoms, an alkenyl group having 2 to 20 carbon atoms, or a heteroaryl group having 6 to 20 carbon atoms, and these groups my be substituted or not substituted or may be bonded to each other to form a ring. Examples of the substituent may include an alkyl group having 1 to 10 carbon atoms, an alkoxy group having 1 to 10 carbon atoms or an aryl group having 6 to 10 carbon atoms. The ring in the case where $R^7$ and $R^9$ form a ring may be any of an aromatic ring, an alicyclic ring and a heterocyclic ring, but it is preferable to form an aromatic ring, it is more preferable to form an aromatic ring having 6 to 20 carbon atoms, and it is further preferable to form an aromatic ring having 6 to 10 carbon atoms.

In the above general formula (5), $R^9$, $R^{10}$ and $R^{11}$ each independently represent a hydrogen atom; a halogen atom; or an organic group having 1 to 20 carbon atoms which may contain a halogen atom, an oxygen atom, a nitrogen atom, a sulfur atom, a phosphorus atom, or a silicon atom; these groups may be substituted or not substituted or may be bonded to each other to form a ring. Specific examples of the organic group having 1 to 20 carbon atoms which may contain a halogen atom, an oxygen atom, a nitrogen atom, a sulfur atom, a phosphorus atom, or a silicon atom are the same as those of the general formulas (1) and (2) above.

$R^9$, $R^{10}$, and $R^{11}$ are preferably a hydrogen atom or an alkyl group having 1 to 20 carbon atoms, more preferably a hydrogen atom or an alkyl group having 1 to 3 carbon atoms.

Specific examples of the compound represented by the above general formula (5) and a method for producing the same include those described in, for example, International Publication No. 03/062253 (JP-A-2005-515260).

The general formula (6) is shown below.

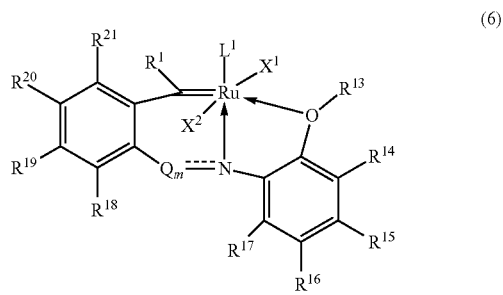

(6)

In the above general formula (6), "m" is 0 or 1. "m" is preferably 1, where "Q" is an oxygen atom, a nitrogen atom, a sulfur atom, a methylene group, an ethylene group or a carbonyl group and preferably a methylene group.

In the above general formula (6), ═══ is a single bond or a double bond, and is preferably a single bond.

$R^1$, $X^1$, $X^2$, and $L^1$ are the same as in the general formulas (1) and (2), and may stand alone and/or be bonded to each other in any combination to form a multidentate chelating ligand. However, it is preferable that $X^1$, $X^2$, and $L^1$ do not form a multidentate chelating ligand and $R^1$ be a hydrogen atom.

$R^{13}$ to $R^{21}$ represent a hydrogen atom; a halogen atom; or an organic group having 1 to 20 carbon atoms which may contain a halogen atom, an oxygen atom, a nitrogen atom, a sulfur atom, a phosphorus atom, or a silicon atom; these groups may be substituted or not substituted or may be bonded to each other to form a ring. Specific examples of the organic group having 1 to 20 carbon atoms which may contain a halogen atom, an oxygen atom, a nitrogen atom, a sulfur atm, a phosphorus atom, or a silicon atom are the same as those of the general formulas (1) and (2) above.

$R^{13}$ is preferably an alkyl group having 1 to 20 carbon atoms, more preferably an alkyl group having 1 to 3 carbon atoms, $R^{14}$ to $R^{17}$ are preferably a hydrogen atom, and $R^{18}$ to $R^{21}$ are preferably a hydrogen atom or a halogen atom.

Specific examples of the compound represented by the above general formula (6) and a method for producing the same include those described in, for example, International Publication No. 11/079799 (JP-A-2013-516392), and the like.

Examples of the ruthenium carbene complex having standard performance used in the present invention include compounds used in Examples described later and the following compound (7). In the compound (7), $PCy_3$ represents a tricyclohexylphosphine, and Mes represents a mesityl group.

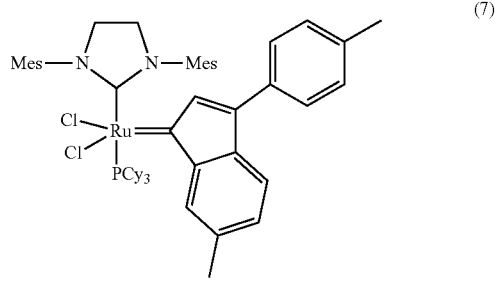

(7)

The amount of the metathesis polymerization catalyst to be used is preferably 0.01 mol or more, more preferably 0.1 to 50 mmol, still more preferably 0.1 to 20 mmol relative to 1 mol of the total monomers used in the reaction. A significantly small amount of the metathesis polymerization catalyst to be used results in significantly low polymerization activity to increase the reaction time, thus reducing production efficiency. A significantly large amount of the metathesis polymerization catalyst to be used results in an excessively active reaction. For this reason, the composition is cured before it is sufficiently filled into the mold, or the catalyst is more likely to be deposited, leading to difficulties in storage.

These metathesis polymerization catalysts may be used alone or in combination.

To control polymerization activity, these metathesis polymerization catalysts may be used in combination with an organic aluminum compound or an organic tin compound as an activator (cocatalyst).

When a compound of a transition metal in Group 5 or 6 in the periodic table is used as the metathesis polymerization catalyst, examples of the activator to be used include alkylaluminum halides such as ethylaluminum dichloride and diethylaluminum chloride; alkoxyalkylaluminum halides in which alkyl groups of these alkylaluminum halides are partially substituted by an alkoxy group; organic tin compounds; and the like. Although not particularly limited, the amount of the activator to be used is usually preferably 0.1 to 100 mol, more preferably 1 to 10 mol relative to 1 mol of the total metathesis polymerization catalysts used in the cycloolefin polymerizable composition.

When the ruthenium carbene complex is used as the metathesis polymerization catalyst, the activator may or may not be used. Use of the ruthenium carbene complex leads to high activity of the catalyst during bulk polymerization, thus resulting in an advantage that the resulting norbornene resin molded article has a reduced odor derived from unreacted norbornene monomers.

An activity regulator may be added as a component of the cycloolefin polymerizable composition. For example, when the cycloolefin polymerizable composition is injected into a mold to initiate polymerization, the activity regulator is used for preventing the start of polymerization during injection.

Examples of the activity regulator when a compound of a Group 5 or 6 transition metal in the periodic table is used as the metathesis polymerization catalyst include compounds having an action of reducing the metathesis polymerization catalyst, and alcohols, haloalcohols, esters, ethers, nitriles, and the like can be used. Among these, preferred are alcohols and haloalcohols, and more preferred are haloalcohols.

Specific examples of the alcohols include n-propanol, n-butanol, n-hexanol, 2-butanol, isobutyl alcohol, isopropyl alcohol, t-butyl alcohol, and the like. Specific examples of the haloalcohols include 1,3-dichloro-2-propanol, 2-chloroethanol, 1-chlorobutanol, and the like.

Examples of the activity regulator when the ruthenium carbene complex is used as the metathesis polymerization catalyst include Lewis base compounds. The Lewis base compounds include those containing phosphorus atoms, such as tricyclopentylphosphine, tricyclohexylphosphine, triphenylphosphine, triphenylphosphite, and n-butylphosphine; those containing nitrogen atoms, such as n-butylamine, pyridine, 4-vinylpyridine, acetonitrile, ethylenediamine, N-benzylidenemethylamine, pyrazine, piperidine, and imidazole; and the like. Also, norbornenes substituted with alkenyl groups, such as vinyl norbornene, propenyl norbornene, and isopropenyl norbornene, function as monomers as well as serve as the active regulator. The amount of these active regulators to be used may be appropriately adjusted depending on the compound used.

Radical Generator

As its action, the radical generator generates radicals when heated, thereby inducing the cross-linking reaction of the cycloolefin resin and inducing the cross-linking reaction between the base resin contained in the gel coat composition and the cycloolefin resin to promote adhesion between the gel coat and the cycloolefin resin layer. Although the sites where the radical generator induces the cross-linking reaction are mainly carbon-carbon double bonds contained in the base resin for the gel coat and the cycloolefin resin, cross-linking may occur involving a saturated bond.

Examples of the radical generator include organic peroxides, diazo compounds, and nonpolar radical generators. Examples of the organic peroxides include hydroperoxides such as t-butyl hydroperoxide, p-menthane hydroperoxide, and cumene hydroperoxide; dialkyl peroxides such as di-t-butyl peroxide, dicumyl peroxide, and t-butylcumyl peroxide; diacyl peroxides such as dipropionyl peroxide and benzyl peroxide; peroxyketals such as 2,5-dimethyl-2,5-di(t-butylperoxy)hexane, 2,5-dimethyl-2,5-di(t-butylperoxy)-3-hexine, and 1,3-di(t-butylperoxyisopropyl)benzene; peroxyesters such as t-butyl peroxyacetate and t-butyl peroxybenzoate; peroxycarbonates such as t-butylperoxyisopropyl carbonate and di(isopropylperoxy)dicarbonate; alkylsilyl peroxides such as t-butyltrimethylsilyl peroxide; and the like. Among then, dialkyl peroxides are particularly preferred in terms of small obstacles to the metathesis polymerization reaction in bulk polymerization.

Examples of the diazo compounds include 4,4'-bisazide-benzal(4-methyl)cyclohexanoxe, 4,4'-diazidechalcone, 2,6-bis(4'-azidebenzal)cyclohexanone, 2,6-bis(4'-azidebenzal)-4-methylcyclohexanone, 4,4'-diazidediphenylsulfone, 4,4'-diazidodiphenylmethane, 2,2'-diazidestilbene, and the like.

Examples of the nonpolar radical generators include 2,3-dimethyl-2,3-diphenylbutane, 2,3-diphenylbutane, 1,4-diphenylbutane, 3,4-dimethyl-3,4-diphenylhexane, 1,1,2,2-tetraphenylethane, 2,2,3,3-tetraphenylbutane, 3,3,4,4-tetraphenylhexane, 1,1,2-triphenylpropane, 1,1,2-triphenylethane, triphenylmethane, 1,1,1-triphenylethane, 1,1,1-triphenylpropane, 1,1,1-triphenylbutane, 1,1,1-triphenylpentane, 1,1,1-tripheny-2-propene, 1,1,1-tripheny-4-pentene, 1,1,1-tripheny-2-phenylethane, and the like.

The amount of the radical generator in the cycloolefin polymerizable composition is usually 0.1 to 10 parts by mass, preferably 0.5 to 5 parts by mass with respect to 100 parts by mass of the total monomers to be used. A content of the radical generator within this range is suitable because the cross-linking reaction sufficiently progresses to produce a molded article having high bending strength and the reaction with the gel coat composition homogeneously progresses to increase the adhesion between the cycloolefin resin layer and the gel coat.

To improve or maintain the properties of the resulting molded article in the present invention, a variety of additives may be blended with the cycloolefin polymerizable composition in the range not impairing the adhesion between the gel coat and the cycloolefin resin layer.

Examples of such additives include a reinforcing material, an antioxidant, a heat stabilizer, a photostabilizer, an ultraviolet absorber, a filler, a pigment, a colorant, a foaming agent, an antistatic agent, a flame retardant, a lubricant, a softening agent, a tackifier, a plasticizer, a mold release agent, a deodorant, a fragrance, an elastomer, thermally polymerized cycloolefin resins and hydrogenated products thereof, and the like.

In a method of preparing the cycloolefin polymerizable composition described later, such a variety of additives are added by a method such as a method of adding additives to a reaction stock solution containing the catalyst and the activator; a method of separately preparing a reaction stock solution of additives and mixing this with a reaction stock solution containing the catalyst and the activator during reaction injection molding; or a method of preliminarily filling these into the mold. The method for addition may be appropriately selected depending on the type of additives.

Examples of the elastomer include natural rubber, polybutadiene, polyisoprene, styrene-butadiene copolymers (SBR), styrene-butadiene-styrene block copolymers (SBS), styrene-isoprene-styrene copolymers (SIS), ethylene-propylene-diene terpolymers (EPDM), ethylene-vinyl acetate copolymers (EVA), hydrides thereof, and the like. The viscosity of the cycloolefin polymerizable composition can be adjusted by use of the elastomer dissolved therein. Addition of the elastomer results in a polymer having improved impact resistance. The amount of the elastomer to be used is preferably 0.5 to 20 parts by mass, more preferably 2 to 10 parts by mass relative to 100 parts by mass of the total monomers in the cycloolefin polymerizable composition.

Examples of the antioxidant include phenol, phosphorus, and amine antioxidants for a variety of plastics and rubbers.

Preparation of Cycloolefin Polymerizable Composition

Although the cycloolefin polymerizable composition used in the present invention is prepared by appropriately mixing the components above by a known method, the cycloolefin polymerizable composition may be prepared by preparing 2 or more solutions and mixing these solutions immediately before a reaction. These solutions are prepared using the components above such that only one of the solutions does not cause bulk polymerization but a cycloolefin polymerizable composition containing the components above in a predetermined proportion is obtained when all the solutions are mixed. Examples of such a combination of 2 or more solutions include two combinations (a) and (b) below depending on the metathesis polymerization catalyst to be used.

(a): As the metathesis polymerization catalyst, one which does not have a polymerization reaction activity by itself but exhibits polymerization reaction activity by using an active agent in combination can be used. In this case, the cycloolefin polymerizable composition can be obtained by mixing a reaction stock solution (A) containing the cycloolefin monomer and the activator with a reaction stock solution (B) containing the cycloolefin monomer and the metathesis polymerization catalyst. Further, a reaction stock solution (C) containing the cycloolefin monomer and containing neither the metathesis polymerization catalyst nor the active agent may be used in combination.

(b): In addition, when one having a polymerization reaction activity alone is used as the metathesis polymerization catalyst, the cycloolefin polymerizable composition can be obtained by mixing a reaction stock solution (a) containing the cycloolefin monomer and a reaction stock solution (b) containing the metathesis polymerization catalyst. At this time, as the reaction stock solution (b), a solution obtained by dissolving or dispersing the metathesis polymerization catalyst in a small amount of an inert solvent is usually used. Examples of such a solvent include aromatic hydrocarbons such as toluene, xylene, ethylbenzene, and trimethylbenzene; ketones such as methyl ethyl ketone, cyclopentanone, cyclohexanone, 2-heptanone, and 4-hydroxy-4-methyl-2-pentanone; cyclic ethers such as tetrahydrofuran; diethyl ether, dichlormethane, dimethyl sulfoxide, and ethyl acetate. Aromatic hydrocarbons are preferred, and toluene is more preferred.

The radical generator and the optional additives may be contained in any one of the reaction stock solutions, or may be added in the form of a mixed solution other than the reaction stock solutions.

As described later, the method for producing a decorated cycloolefin resin molded article according to the present invention can be performed by applying a known resin forming method. Preferably, mixing of the reaction stock solutions above is performed by a mixing apparatus appropriately selected according to the resin forming method to be applied. Examples of the apparatus include a collision mixer usually used in reaction injection molding, a low pressure mixer such as a dynamic mixer and a static mixer, and the like. After introduced to such an apparatus, the reaction stock solutions are immediately mixed to yield a cycloolefin polymerizable composition.

The cycloolefin polymerizable composition can appropriately contain a fibrous filler and/or a particulate filler. A fiber-reinforced cycloolefin resin layer can be obtained by polymerizing the cycloolefin polymerizable composition containing a fibrous filler. Thus, a fiber-reinforced decorated cycloolefin resin molded article including a gel coat disposed on the fiber-reinforced cycloolefin resin layer can be obtained.

Generally, fiber-reinforced plastics have a grain of fibers derived from depressions and projections of fibers caused on the surfaces after forming due to differences in shrinkage rate and linear coefficient of expansion between the reinforcing fibers and the matrix resin which constitute each fiber-reinforced plastic. Such a grain of fibers is transferred onto the surfaces of their decorative coats. Because such a grain of fibers is also caused in fiber-reinforced plastics containing a cycloolefin resin as a matrix resin, the grain of fibers is transferred onto the surfaces of coats formed by decoration using standard application. Thus, there has been a demand for gel coat decoration which ensures a larger thickness and is hard to undergo transfer of the grain of fibers.

Because the decorated cycloolefin resin molded article prepared by the production method according to the present invention includes a gel coat and a fiber-reinforced cycloolefin resin layer adhering to each other, its gel coated surface is smooth, and unevenness corresponding to depressions and projections of reinforcing fibers is hardly observed on the surface.

The fibrous filler is not particularly limited as long as it is used in this field. From the viewpoint of availability and usefulness, the fibrous filler is preferably one or more fibers selected from the group consisting of carbon fibers and glass fibers as long fibers. If a carbon fiber is used in combination with a glass fiber, the mixing ratio thereof is not limited. Fran the viewpoint of mixing efficiency, the mixing ratio of the glass fiber is preferably 0.1 to 10 parts by mass relative to 1 part by mass of the carbon fiber.

The form of the fibrous filler used in the present invention is not particularly limited, and may be appropriately selected from those of a unidirectional material in which fibrous fillers are aligned in one direction, a fabric, a non-woven fabric, a mat, a knit, a braided string, a roving, a chapped fiber, and the like. Among these, preferred are forms of continuous fibers such as the forms of a unidirectional material, a fabric, and a roving. The resulting fiber-reinforced cycloolefin resin contains fibers in a high proportion, which is suitable and can highly improve mechanical strength.

As the form of a fabric, those conventionally known are available. For example, all the woven structures in which fibers are interlaced by plain weave, satin weave, twill weave, triaxial weave, or the like can be used. In addition, as the form of a fabric, a stitched fabric or a three dimensional fabric including fibers reinforced in not only the two-dimensional direction but also the thickness direction thereof can be used.

When a fibrous filler material is used in a fabric or the like, it is usually used as a fiber bundle yarn. The number of filaments in one fiber bundle yarn is not particularly limited, but is preferably in the range of 1,000 to 100,000, more preferably 5,000 to 50,000, and still more preferably 10,000 to 30,000.

The carbon fiber used in the present invention is not particularly limited, and various kinds of carbon fibers produced by conventionally known methods, such as acrylic carbon fibers and pitch-based and rayon-based carbon fibers, can be arbitrarily used, for example. Among these, PAN-based carbon fibers produced using polyacrylonitrile fibers as a raw material are suitably used because these PAN-based carbon fibers ensure the resulting fiber-reinforced cycloolefin resin having improved properties such as mechanical strength and heat resistance without inhibiting the metathesis polymerization reaction.

A higher elastic modulus of the carbon fiber is preferred because its stiffness can be more significantly maintained, thus reducing the thickness of the fiber-reinforced cycloolefin resin layer. In contrast, if the elastic modulus is too high, the tensile elongation may be reduced in some cases. The carbon fiber preferably has a tensile modulus by the resin-impregnated strand tensile test (JIS R-7601) in the range of 200 to 400 GPa, more preferably 220 to 300 GPa. Further, as the carbon fiber, those having high tensile elongation are preferred. The tensile elongation is preferably 1.7% or more, more preferably 1.85% or more, particularly preferably 2% or more. There is no particular upper limit to such tensile elongation, but it is usually 2.5% or less. The tensile elongation of the carbon fiber can be measured by the above-mentioned resin-impregnated strand tensile test. As the carbon fiber has higher tensile elongation, the fiber is stronger and easier to handle, resulting in a fiber-reinforced cycloolefin resin having high mechanical strength, which is preferred.

To further increase the adhesion between the cycloolefin resin as the matrix resin and the carbon fiber, at least an appropriate amount of an active hydrogen-containing group such as a carboxyl group and a hydroxyl group is preferably present on the surface of the carbon fiber. The amount of the active hydrogen-containing group in the carbon fiber can be quantified by the surface oxygen concentration (O/C) measured by X-ray photoelectron spectroscopy. The amount of the active hydrogen-containing group of the carbon fiber is preferably 0.02 to 0.2 in terms of O/C. The amount within this range is suitable because the action of the active hydrogen reactive group (such as an isocyanate group or an (meth)acrylate group) contained in the cycloolefin monomer on the carbon fiber is increased, and the degree of oxidation of the surface of the carbon fiber is also appropriate. The amount of the active hydrogen-containing group of the carbon fiber is more preferably 0.04 to 0.15, still more preferably 0.06 to 0.1 in terms of O/C.

The method of introducing the active hydrogen-containing group into the carbon fiber is not particularly limited, and a cam only used method may be appropriately employed. Although an ozone method, an electrolytic oxidation in an acid solution, and the like are known, an oxidation reaction in a solution is preferred because it is economically excellent. At this time, the amount of the active hydrogen-containing group can be appropriately adjusted by the amount of current, the temperature, the residence time in an acidic bath, acidity, and the like.

The surface state of the carbon fiber is not particularly limited, and may be smooth or uneven. Since an anchor effect can be expected, it is preferable to have unevenness. The degree of unevenness may be appropriately selected. Introduction of unevenness into the surface of the carbon fiber can be performed simultaneously during the above-described oxidation reaction in the solution, for example.

The cross-sectional shape of the carbon fiber is not particularly limited, but is preferably substantially circular. Mien the cycloolefin polymerizable composition is impregnated, such a circular cross-sectional shape facilitates rearrangement of the filaments, and thus permeation of the cycloolefin polymerizable composition. In addition, the circular cross-sectional shape can reduce the thickness of the fiber bundle to facilitate production of a fiber-reinforced cycloolefin resin having excellent drapability. Incidentally, the state where the cross-sectional shape is substantially circular means that the degree of deformation is 1.1 or less when the ratio (R/r) of the circumscribed circle radius "R" and the inscribed circle radius "r" of the cross section is defined as the degree of deformation.

The length of the carbon fiber may be appropriately selected depending on the intended use, and any of short fibers and long fibers may be used. To further enhance the mechanical strength of the resulting fiber-reinforced cycloolefin resin, the carbon fiber to be used has a length of usually 1 cm or more, preferably 2 cm or more, more preferably 3 cm or more, and is particularly preferably a continuous carbon fiber.

Although it is not necessary that the carbon fiber used in the present invention includes a sizing agent adhering thereto in advance, use of a carbon fiber including a sizing agent adhering thereto in advance is preferred from the viewpoint of preventing a defect in deterioration of physical properties after forming due to fiber fluffing and further improving the adhesion between the cycloolefin resin as the matrix resin and the carbon fiber.

There is no particular limitation to the sizing agent, and known sizing agents can be used. Examples of the sizing agents include at least one kind selected from the group consisting of epoxy resins; urethane resins; vinyl ester resins; polyamide resins; polyolefin resins such as a nylon resin, polyethylene, and polypropylene; polyester resins; and phenol resins. As the sizing agent, from the view point of availability, preferred are at least one kind selected from the group consisting of epoxy resins, urethane resins, vinyl ester resins, and polyolefin resins, and more preferred are an epoxy resin and/or a vinyl ester resin.

Examples of such sizing agents include, as all products manufactured by Matsumoto Yushi-Seiyaku Co., Ltd, those composed of epoxy resins, such as KP-226, KP-0110, KP-136, KP-300, KP-752, and KP-1005; those composed of urethane resins, such as KP-2816, KP-2817, KP-2807, KP-2820, and KP-2821; those composed of vinyl ester resins, such as KP-371 and KP-372; those composed of nylon resins, such as KP-1008; those composed of polyethylene resins, such as P-138; those composed of polypropylene resins, such as TPE-100 and TPE-102; those composed of polyester resin, such as KP-880 and KP-881; and the like.

The adhesion of the sizing agent to the carbon fiber can be performed by bringing the sizing agent into contact with the carbon fiber. In this case, it is preferable that the sizing agent be dispersed or dissolved in water or an organic solvent such as acetone, and be used as a dispersion or a solution thereof. Fran the viewpoint of enhancing dispersibility of the sizing agent and improving liquid stability, it is preferable to add a surfactant as appropriate to the dispersion or the solution.

The amount of the sizing agent adhering to the carbon fiber is usually 0.1 to 5 mass %, preferably 0.2 to 3 mass %, more preferably 0.5 to 2 mass % of the total amount of the carbon fiber and the sizing agent. When the amount of adhesion is within this range, moderate convergence of the carbon fiber is obtained, sufficient scratch resistance of the carbon fiber is obtained, and generation of fluff due to mechanical friction or the like is suppressed. In addition, impregnation properties of the cycloolefin polymerizable composition are improved, resulting in a fiber-reinforced cycloolefin resin having improved mechanical strength.

The contact between the carbon fiber and the sizing agent can be appropriately performed by a method generally used industrially, such as a roller dipping method and a roller contact method. Since the contact between the carbon fiber and the sizing agent is usually performed using a dispersion or solution of a sizing agent, after the contact, the product may be subjected to a drying step to remove water or an organic solvent contained in the dispersion or solution of the sizing agent. The drying step can be performed by a method using hot air, a hot plate, a roller, various infrared heaters, or the like as a heat medium.

Note that, the adhesion of the sizing agent to the carbon fiber is preferably performed after the introduction of the active hydrogen-containing group onto the surface of the carbon fiber and the introduction of the unevenness described above.

The glass fiber used in the present invention is not particularly limited, and examples thereof include those having a shape, such as a continuous fiber, a woven fabric, and a nonwoven fabric, and those having various thicknesses are available as commercially products. The shape and thickness of the glass fiber may be appropriately selected depending on the intended use.

The basis weight of the glass fiber used in the present invention is appropriately selected according to the purpose of use, and is preferably 600 g/m$^2$ or more, more preferably 600 to 2000 g/m$^2$, still more preferably 640 to 1800 g/m$^2$. If the basis weight of the glass fiber is within this range, appropriate gaps are formed between adjacent glass fibers, resulting in a fiber-reinforced cycloolefin resin having favorable mechanical strength. The glass fiber having such a basis weight has favorable flexibility, suitably resulting in a cycloolefin polymerizable composition having improved impregnation properties.

The glass fiber preferably has a surface subjected to a hydrophobization treatment. By using such a hydrophobized glass fiber, the glass fiber can be homogeneously dispersed in the resulting fiber-reinforced cycloolefin resin, ensuring uniform rigidity and dimensional stability of the fiber-reinforced cycloolefin resin and further reducing the anisotropy. Examples of the treatment agent used in the hydrophobization treatment include a silane coupling agent, a titanate coupling agent, an aluminum coupling agent, a fatty acid, an oil and fat, a surfactant, a wax, other polymers, and the like. These treatment agents can also serve as sizing agents.

Examples of the short fibers include cut products of the carbon fibers and the glass fibers, wollastonite, potassium titanate, Zonolite, basic magnesium sulfate, aluminum borate, tetrapod-type zinc oxide, gypsum fibers, phosphate fibers, alumina fibers, needle-like calcium carbonate, needle-like boehmite, and the like.

For the quantitative relation between the fibrous filler and the cycloolefin polymerizable composition impregnated into the fibrous filler, the content of the fibrous filler is preferably 0.2 to 3 parts by volume, more preferably 0.5 to 2.5 parts by volume, still more preferably 0.7 to 2 parts by volume relative to 1 part by volume of the cycloolefin polymerizable composition. If the content is within such a range, the resulting molded article exhibits favorable bending strength, which is suitable.

Specific examples of the particulate filler include calcium carbonate, calcium hydroxide, calcium silicate, calcium sulfate, aluminum hydroxide, magnesium hydroxide, titanium oxide, zinc oxide, barium titanate, silica, alumina, carbon black, graphite, antimony oxide, red phosphorus, a variety of metal powders, clay, a variety of ferrites, hydrotalcite, and the like.

The particulate filler preferably has a surface subjected to a hydrophobization treatment. By using such a hydrophobized particulate filler, aggregation and sedimentation of the particulate filler in the cycloolefin polymerizable composition can be prevented, and the particulate filler can be homogeneously dispersed in the cycloolefin resin layer formed by polymerizing the cycloolefin polymerizable composition.

Examples of the treatment agent used in the hydrophobization treatment include silane coupling agents such as vinyltrimethoxysilane, titanate coupling agents, aluminum coupling agents, fatty acids such as stearic acid, oils and fats, surfactants, waxes, and the like. The hydrophobization treatment of the particulate filler may be performed by mixing the hydrophobization treatment agent simultaneously when the cycloolefin polymerizable composition is prepared, or may be preliminarily performed on the particulate filler to be used.

To enhance the adhesion to the filler added to the cycloolefin polymerizable composition, a compound having a polarity, such as an isocyanate compound or a polyfunctional acrylate compound, can be optionally added.

Examples of the isocyanate compound include aromatic diisocyanate compounds such as 4,4'-methylenediphenyl diisocyanate (MDI), toluene-2,4-diisocyanate, 4-methoxy-1,3-phenylene diisocyanate, 4-isipropyl-1,3-phenylene diisocyanate, 4-chloro-1,3-phenylene diisocyanate, 4-butoxy-1,3-phenylene diisocyanate, 2,4-diisocyanate diphenyl ether, 1,4-phenylene diisocyanate, tolylene diisocyanate, xylylene diisocyanate (XDI), 1,5-naphthalene diisocyanate, benzidine diisocyanate, o-nitrobenzidine diisocyanate, and 4,4'-dibenzyl diisocyanate; aliphatic diisocyanate compounds such as methylene diisocyanate, 1,4-tetramethylene diisocyanate, 1,6-hexamethylene diisocyanate, and 1,10-decamethylene diisocyanate; alicyclic diisocyanate compounds such as 4-cyclohexylene diisocyanate, 4,4'-methylene bis(cyclohexyl isocyanate), 1,5-tetrahydronaphthalene diisocyanate, isophorone diisocyanate, hydrogenated MDI, and hydrogenated XDI; polyurethane prepolymers prepared by reacting these diisocyanate compounds with a low molecular weight polyol or polyamine to be isocyanate terminated; and the like.

The amount of the diisocyanate compound blended with the cycloolefin polymerizable composition is preferably 0.5 to 20 parts by mass, more preferably 1 to 15 parts by mass, still more preferably 2 to 10 parts by mass relative to 100 parts by mass of the total monomers to be used.

The amount of the polyfunctional acrylate compound blended with the cycloolefin polymerizable composition is preferably 0.5 to 20 parts by mass, more preferably 1 to 15 parts by mass, still more preferably 2 to 10 parts by mass relative to 100 parts by mass of the total monomers to be used. Examples of the polyfunctional acrylate compound include ethylene glycol dimethacrylate, triethylene glycol dimethacrylate, trimethylolpropane trimethacrylate (trimethylpropane trimethacrylate), neopentyl glycol dimethacrylate, and the like.

The content of the particulate filler in the cycloolefin polymerizable composition is, usually, preferably 10 to 1000 parts by mass, more preferably 100 to 500 parts by mass relative to 100 parts by mass of the total monomers to be used. If the content is within such a range, the resulting molded article can have enhanced strength, which is suitable.

The fillers described above may be preliminarily contained in the cycloolefin polymerizable composition and then injected therewith into a mold, or may be preliminarily disposed in a mold and then the cycloolefin polymerizable composition may be injected thereinto. These methods may be appropriately selected.

Forming Method

In the production method according to the present invention, the forming method for obtaining a decorated cycloolefin resin molded article is not particularly limited, and a known resin forming method can be appropriately used depending on a desired shape of the target molded article. Examples of the resin forming method include reaction injection molding (RIM), resin transfer molding (RTM), and infusion molding.

For example, when the decorated cycloolefin resin molded article prepared by the production method according to the present invention includes the gel coat and the fiber-reinforced cycloolefin resin layer, the decorated cycloolefin resin molded article can be produced by the following method: The gel coat composition is applied to the surface of a old, the fibrous filler is disposed on an uncured or semi-cured coating film of the gel coat composition to impregnate the fibrous filler with the cycloolefin polymerizable composition. Thereafter, the gel coat composition is cured and the cycloolefin polymerizable composition is polymerized while the coating film is in contact with the impregnated cycloolefin polymerizable composition. If the coating film of the gel coat composition is completely cured before polymerization of the cycloolefin polymerizable composition, sufficient adhesion is not obtained.

In addition, by applying the gel coat composition onto the surface of the mold and then placing the cycloolefin polymerizable composition onto the coating film of the gel coat composition, the surface of the mold can be transferred onto the gel coat with high quality to obtain a decorated cycloolefin resin molded article having a smooth gel coated surface on which unevenness corresponding to depressions and projections of the reinforcing fibers is hardly observed.

The temperature of the cycloolefin polymerizable composition before feeding to the mold is preferably 10 to 60° C., and the viscosity of cycloolefin polymerizable composition is usually about 5 to 3000 mPa·s, preferably about 50 to 1000 mPa·s at 30° C., for example. Fran the viewpoint of decorative properties and strength, the thickness of the resulting gel coat is preferably 10 to 500 μm, more preferably 30 to 100 μm.

Mold

The material for the mold to be used is not particularly limited, and specific examples thereof include metal materials such as steel, aluminum, zinc alloys, nickel, copper, and chromium, or resins. The metal material may be appropriately selected depending on the structure of the mold and the resin forming method to be used, in consideration of the process, such as forging, casting, electrocasting, thermal spraying, or plating, depending on the shape of a desired molded article.

If the fibrous filler is preliminarily disposed in the mold, it may be disposed in the selected mold depending on the resin forming method to be used in a manner suitable for performing the method. Appropriately, the inside of the mold may be purged with an inert gas such as nitrogen gas, or may be kept under reduced pressure.

RIM

In this method, usually, a mold having a split mold structure, namely, including a male mold and a female mold is used, although not particularly limited. The male mold and the female mold are produced to form a gap (cavity) corresponding to a desired molded article. The fibrous filler is disposed in the gap of the mold. The cycloolefin polymerizable composition is impregnated into the fibrous filler by injecting the cycloolefin polymerizable composition into the mold. Due to its low viscosity and high impregnation properties into a base material, the cycloolefin polymerizable composition used in the present invention can be homogeneously impregnated into the fibrous filler.

In forming of the resin of 2-solution reaction type by RIM, the pressure for injecting the raw material (cycloolefin polymerizable composition) into the mold during formation is about 1/30 to 1/500 of that in injection molding where a resin is injected. For this reason, the mold filling properties are significantly favorable, enabling formation of a variety of shapes with ease. The injection pressure to the inside of the mold is significantly small, and thus the internal pressure generated therein is also significantly small. For this reason, compared to that of the mold used in injection molding, the strength required for the mold is significantly reduced, facilitating design of the mold. Accordingly, the mold for a large molded article is easily designed, facilitating development of pipe members having a large diameter, in which application of resin pipe members are difficult. Moreover, RIM enables forming in the range of normal temperature.

The filling pressure (injection pressure) when the cycloolefin polymerizable composition is filled into the cavity of the mold is usually 0.01 to 9.8 MPa, preferably 0.02 to 5 MPa. The clamping pressure is usually in the range of 0.01 to 10 MPa.

RTM

In RTM (resin transfer molding), the cycloolefin polymerizable composition can be impregnated into the fibrous filler by injecting the cycloolefin polymerizable composition into a mold lined with the fibrous filler.

In forming by RTM, the pressure generated inside the mold is also small as in the case of RIM, and the mixing pressure needed for mixing the cycloolefin polymerizable composition is not as large as that in RIM. For this reason, the mixing facility can be relatively simplified. Usually, the polymerization rate is slower than that in RIM, often leading to advantages in impregnation.

The filling pressure (injection pressure) when the cycloolefin polymerizable composition is filled into the cavity of the mold is usually 0.01 to 9.8 MPa, preferably 0.02 to 5 MPa. The clamping pressure is usually in the range of 0.01 to 10 MPa.

Infusion Molding

In infusion molding, the cycloolefin polymerizable composition is filled into the mold under vacuum pressure (about 0.1 to 100 Pa) to impregnate the cycloolefin polymerizable composition into the fibrous filler (such as the glass fiber). Specifically, the fibrous filler is disposed in the mold, and is covered with an airtight film, as desired, while a releasing sheet and a resin diffusion material are disposed. Thereafter, the air in the airtight space is discharged by suction into a depressurized state. The cycloolefin polymerizable composition is injected into the airtight space in this depressurized state to impregnate the cycloolefin polymerizable composition into the fibrous filler. This method is a fouling-free and odor-free forming method, and is suitable for formation of molded articles having high strength, such as large molded articles and thick molded articles.

Beside the methods above, light-resin transfer molding (L-RTM) as an improved method can also be used in the method for producing a decorated cycloolefin resin molded article according to the present invention. Basically, this is a forming method of infusion molding combined with RTM, in which using a mold including a female mold and a male mold, the fibrous filler is disposed in the female mold, and is covered with the male mold, and the mold is depressurized in an outer peripheral flange portion and the central portion. The mold is clamped while the inside thereof is in vacuum (about 0.1 to 100 Pa). Thereafter, the cycloolefin polymerizable composition is injected from an outer periphery to impregnate the composition into the fibrous filler. Excess cycloolefin polymerizable composition is caught in a central pot of the mold. The cycloolefin polymerizable composition is forced into the mold from the outer periphery, and injection of the composition is performed by depressurization and pressurization. The filling pressure (injection pressure) when the cycloolefin polymerizable composition is filled into the cavity of the mold is usually 0.01 to 10 MPa, preferably 0.02 to 5 MPa. The clamping pressure is usually in the range of 0.01 to 10 MPa.

Other Impregnation Methods

Examples of other impregnation methods to be used include a method of preparing a dry fibrous filler wound around any cylinder by a filament winding method or the like, and immersing the fibrous filler in the cycloolefin polymerizable composition to impregnate the fibrous filler with the composition; a method of spraying the cycloolefin polymerizable composition to the fibrous filler to impregnate the fibrous filler with the composition; a method in which the reaction stock solutions used in combination described above are individually sprayed to the fibrous filler, and are mixed simultaneously with spraying to impregnate the fibrous filler with the cycloolefin polymerizable composition; and the like.

Bulk polymerization is performed by heating the mold containing the injected cycloolefin polymerizable composition before or after the injection. The heating method can be appropriately determined depending on the metathesis polymerization catalyst used in the cycloolefin polymerizable composition.

If the cycloolefin polymerizable composition fed into the cavity of a mold including a pair of a male mold and a female mold is subjected to bulk polymerization in the presence of a metathesis polymerization catalyst having a transition metal atom of Group 6, such as molybdenum or tungsten, as the center atom, the temperature of one of the male old and the female mold in the mold is preferably 30° C. or more and 80° C. or less, more preferably 40° C. or more and 75° C. or less, still more preferably 45° C. or more and 70° C. or less to form a surface of the molded article for forming the gel coat which has a good surface appearance without sink marks or air bubbles. The temperature of the other of the male and the female mold in the mold is preferably 50° C. or more and 100° C. or less, more preferably 60° C. or more and 95° C. or less, still more preferably 70° C. or more and 90° C. or less. The difference in temperature between the male mold and the female mold is preferably 10° C. or more and 50° C. or less, more preferably 15° C. or more and 45° C. or less, still more preferably 20° C. or more and 40° C. or less.

If the metathesis polymerization catalyst is a metathesis polymerization catalyst having a transition metal atom of Group 8, such as ruthenium or osmium, as the central metal, for example, the highest temperature of the mold is preferably 90° C. or more and 300° C. or less. The highest temperature is more preferably 100 to 270° C., still more preferably 120 to 250° C. The lowest temperature for bulk polymerization is preferably 40 to 90° C., more preferably 50 to 85° C. The starting temperature for bulk polymerization is usually in the range of 0 to 40° C., preferably 10 to 30° C.

If the metathesis polymerization catalyst is a metathesis polymerization catalyst having a transition metal atom of Group 8, such as ruthenium or osmium, as the central metal, for example, the difference in temperature between the male mold and the female mold is preferably 30° C. or less, more preferably 25° C. or less, still more preferably 20° C. or less to form a surface which has a good surface appearance without sink marks or air bubbles.

Examples of the method of adjusting the temperature of the mold include adjustment of the mold temperature with a heater; adjustment of the temperature of a heat medium (such as temperature-adjusted water or oil) circulated through a pipe embedded inside the mold; and the like.

Although bulk polymerization is completed in preferably 20 seconds to 60 minutes, more preferably 20 seconds to 40 minutes after the cycloolefin polymerizable composition is injected into the mold or is introduced into a predetermined mixing apparatus, it may be maintained for about 60 to 200 minutes as it is. The heating may be performed in a single stage, or may be performed in a multi-stage, i.e., two or more stages.

After the end of bulk polymerization, for example, the mold frame can be opened and the mold can be removed to obtain the molded article. In this specification, "remove the mold" indicates that the resulting molded article is extracted from the mold used. Because the molded article immediately after produced is in a high temperature, the rec val of the mold is preferably performed after it is cooled to normal temperature.

Thus, the decorated cycloolefin resin molded article is obtained. The decorated cycloolefin resin molded article is a molded article having a gel coat-decorated surface (gel coat) adhering to the cycloolefin resin layer, and the adhesion between the gel coat-decorated surface and the cycloolefin resin layer is usually ranked as classification 0 or 1, which indicates an acceptable level, in the adhesive properties test according to the method specified in JIS K5600.

EXAMPLES

Hereinafter, the present invention will be described in more detail based on Examples, but it should not be construed that Examples are limitations to the present invention. In Examples, RTM will be described, in which using a metal mold, the cycloolefin polymerizable composition is impregnated into a carbon fiber. Besides, other known RIM and infusion molding methods can also be performed.

Example 1

AF7-EZ available from Chemlease as a mold release agent was applied onto the inner surface of an aluminum mold of vertical separation type having an inner dimension of 300 mm in length, 200 mm in width, and 2 mm in thickness and composed of male and female molds into which the cycloolefin polymerizable composition can be injected. The female mold was heated to 50° C., and a gel coat composition 1 described later was sprayed onto the inner bottom surface with a spray applicator such that the film thickness was about 50 μm.

The sprayed gel coat composition 1 was heated at 50° C. for 30 minutes to be semi-cured such that the surface was sticky. Thereafter, a plain-woven carbon fiber mat CK6240E available from Toray Industries, Inc. and cut along fibers into a size of 290 mm in length and 190 mm in width was spread, and 10 sheets thereof were layered inside the female mold. The male mold was placed to the female mold, and the entire mold was heated to 50° C. The cycloolefin polymerizable composition 1 described later was then fully injected into the mold.

After the mold was left to stand at 50° C. for 10 minutes, the entire mold was heated at 90° C. for 30 minutes, and was further heated at 120° C. for 1 hour. Thereafter, the male mold and the female mold were separated to remove a decorated cycloolefin resin molded article having a gel coat-decorated fiber-reinforced cycloolefin resin layer from the mold.

The resulting fiber-reinforced cycloolefin resin layer was composed of 51 parts by volume of the carbon fibers and 49 parts by volume of the cycloolefin resin, and had a bending strength of 640 MPa, which was measured according to JIS K7017.

The adhesion state of the gel coat-decorated surface of the fiber-reinforced cycloolefin resin layer was examined by the method specified in JIS K5600. The test result was determined as classification 1. The test result determined as classification 0 or 1 was acceptable, and the adhesion between the gel coat and the cycloolefin resin layer in the resulting gel coat-decorated cycloolefin resin molded article was acceptable.

Preparation of Gel Coat Composition 1

In a room at 23° C., 2 parts by mass of methyl ethyl ketone peroxide was added to and mixed with 100 parts by mass of NR-AC0001P available from Tokan Material Technology Co., Ltd. The prepared gel coat composition 1 was used immediately after the preparation. The gel coat composition 1 contained 1 mass % or less of a curing accelerator such as a cobalt compound or a manganese compound.

Preparation of Cycloolefin Polymerizable Composition 1

In a room at 23° C., 5 parts by mass of trimethylpropane trimethacrylate, 5 parts by mass of hexamethylene diisocyanate, and 2 parts by mass of di-t-butyl peroxide were mixed with a cycloolefin mixture containing 93 parts by mass of dicyclopentadiene and 7 parts by mass of tricyclopentadiene to prepare a mixed solution (A).

In a room at 23° C., 0.03 parts by mass of [1,3-bis-(2,4, 6-trimethylphenyl)-2-imidazolidinylidene]dichloro(phenylmethylene) (trichlorohexylphosphine)ruthenium was dissolved in 1 part by mass of cyclopentanone to prepare a mixed solution (B).

Immediately after the preparation of the mixed solutions (A) and (B), the mixed solutions (A) and (B) were homogenously mixed to prepare a cycloolefin polymerizable composition 1. The prepared cycloolefin polymerizable composition 1 was immediately used.

Example 2

A decorated cycloolefin resin molded article including a gel coat-decorated fiber-reinforced cycloolefin resin layer was prepared in the same manner as in Example 1 except that a gel coat composition 2 was sprayed instead of the gel coat composition 1. The resulting fiber-reinforced cycloolefin resin layer was composed of 51 parts by volume of the carbon fiber and 49 parts by volume of the cycloolefin resin, and had a bending strength of 635 MPa, which was measured according to JIS K7017.

The adhesion state of the gel coat-decorated surface of the fiber-reinforced cycloolefin resin layer was examined by the method specified in JIS K5600. The test result was determined as classification 1. The test result determined as classification 0 or 1 was acceptable, and the adhesion state of the gel coat and the cycloolefin resin layer in the resulting gel coat-decorated cycloolefin resin molded article was acceptable.

Preparation of Gel Coat Composition 2

In a room at 23° C., 1 part by mass of di(4-tert-butylcyclohexyl)peroxy dicarbonate and 1 part by mass of 2,2,4-trimethyl-1,3-pentanediol diisobutyrate were mixed into a paste, and the paste was acted to and mixed with 100 parts by mass of NR-AC0001P available from Tokan Material Technology Co., Ltd. The prepared gel coat composition 2 was immediately used after the preparation. The gel coat composition 2 contained 1 mass % or less of a curing accelerator such as a cobalt compound or a manganese compound.

INDUSTRIAL APPLICABILITY

The decorated cycloolefin resin molded article prepared by the production method according to the present invention is excellent and has high-quality decoration feature beyond standard application while having the properties of the cycloolefin resin. Accordingly, the decorated cycloolefin resin molded article can be suitably used in the fields in which cycloolefin resins are usually used, such as housings of moving bodies and traveling bodies and numbers for housing facilities.

The invention claimed is:

1. A method for producing a decorated cycloolefin resin molded article, comprising:
    curing a gel coat composition containing a base resin and a thermal curing agent and polymerizing a cycloolefin polymerizable composition containing a radical generator at the same timing while the gel coat composition is in contact with the cycloolefin polymerizable composition, thereby obtaining the decorated cycloolefin resin molded article including a gel coat obtained by curing the gel coat composition and a cycloolefin resin layer obtained by polymerizing the cycloolefin polymerizable composition adhering to each other,
    wherein an amount of the thermal curing agent is 0.2 to 4 parts by mass relative to 100 parts by mass of the base resin, a content of a curing accelerator in the gel coat composition is 1 mass % or less, and the cycloolefin polymerizable composition further comprises an isocyanate compound and/or a polyfunctional acrylate compound,
    the isocyanate compound is at least one selected from the group consisting of 4,4'-methylenediphenyl diisocyanate, toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 1,4-phenylene diisocyanate, tolylene diisocyanate, xylylene diisocyanate, 1,5-naphthalene diisocyanate, benzidine diisocyanate, o-nitrobenzidine diisocyanate, 4,4'-dibenzyl diisocyanate, methylene diisocyanate, 1,4-tetramethylene diisocyanate, 1,6-hexamethylene diisocyanate, 1,10-decamethylene diisocyanate, 4-cyclohexylene diisocyanate, 4,4'-methylene bis(cyclohexyl isocyanate), 1,5-tetrahydronaphthalene diisocyanate, isophorone diisocyanate, hydrogenated 4,4'-methylenediphenyl diisocyanate, hydrogenated xylylene diisocyanate, and a polyurethane prepolymer prepared by reacting these diisocyanate compounds with a low molecular weight polyol or polyamine to be isocyanate terminated, and
    the polyfunctional acrylate compound is at least one selected from the group consisting of ethylene glycol dimethacrylate, triethylene glycol dimethacrylate, trimethylolpropane trimethacrylate, and neopentyl glycol dimethacrylate.

2. The method for producing the decorated cycloolefin resin molded article according to claim 1, wherein the cycloolefin polymerizable composition contains a filler.

3. The method for producing the decorated cycloolefin resin molded article according to claim 2, wherein the filler includes at least one of a fibrous filler and a particulate filler.

* * * * *